(12) United States Patent
Baessler et al.

(10) Patent No.: US 6,813,728 B1
(45) Date of Patent: Nov. 2, 2004

(54) METHOD AND A DEVICE FOR CHECKING THE FUNCTIONING OF A COMPUTER

(75) Inventors: Hartmut Baessler, Berglen (DE); Uwe Kleinschmidt, Tamm (DE); Burkhard Triess, Ludwigsburg (DE); Erich Hermann, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/489,818

(22) Filed: Jan. 24, 2000

(30) Foreign Application Priority Data

Jan. 28, 1999 (DE) .......................................... 199 03 302

(51) Int. Cl.$^7$ ................................................ G06F 11/00
(52) U.S. Cl. ............................ 714/25; 714/35; 710/260
(58) Field of Search ............................... 714/25, 34, 35, 714/6; 710/260–269

(56) References Cited

U.S. PATENT DOCUMENTS

| | | | | |
|---|---|---|---|---|
| 4,181,940 A | * | 1/1980 | Underwood et al. | 714/25 |
| 4,212,059 A | * | 7/1980 | Sato et al. | 714/25 |
| 4,315,311 A | * | 2/1982 | Causse et al. | 714/25 |
| 5,396,619 A | * | 3/1995 | Walton | 714/25 |
| 5,530,804 A | * | 6/1996 | Edgington et al. | 703/28 |
| 5,897,653 A | * | 4/1999 | Tashima | 324/73.1 |
| 5,933,626 A | * | 8/1999 | Mahalingaiah et al. | 712/227 |
| 5,944,841 A | * | 8/1999 | Christie | 714/38 |
| 5,951,696 A | * | 9/1999 | Naaseh et al. | 714/30 |
| 5,983,367 A | * | 11/1999 | Higuchi et al. | 365/185.25 |
| 6,105,102 A | * | 8/2000 | Williams et al. | 710/261 |
| 6,145,123 A | * | 11/2000 | Torrey et al. | 703/28 |
| 6,314,530 B1 | * | 11/2001 | Mann | 714/25 |

* cited by examiner

*Primary Examiner*—Scott Baderman
*Assistant Examiner*—Marc Duncan
(74) *Attorney, Agent, or Firm*—Kenyon & Kenyon

(57) ABSTRACT

A method and a device for checking the functioning of a computer are proposed, the computer in a normal operating state having access to the working memory via bus lines. For the purposes of checking, provision is made for an alternate memory and a switchover device, as a result of the switchover device the access of the computer being diverted such that access is not to the working memory but rather to the alternate memory. The content of the alternate memory can be influenced by a user. In the alternate memory provision is made for an auxiliary program, which is executed when activated by the computer and which makes available information concerning the internal operating states of the computer.

9 Claims, 2 Drawing Sheets

METHOD AND A DEVICE FOR CHECKING THE FUNCTIONING OF A COMPUTER

BACKGROUND INFORMATION

It is already known for the purpose of checking the functioning of a computer to divert the access from the normal working (main) memory of the computer to an alternate memory. In this alternate memory, other program flows or other data for the program flows can then be used, and a check test can therefore be carried out as to whether the computer then better monitors (registers) its open-loop and closed-loop control functions. Furthermore, so-called debuggers are known which generate statements concerning the internal operating states of the computer. Checking of this type was only possible in the laboratory but not under the near-series conditions of the computer.

SUMMARY OF THE INVENTION

The method and the device of the present invention have the advantage that it is possible to check the functioning of the computer under real operating conditions. In this context, both the functioning of existing programs as well as the effects of alterations of programs on the functioning of the computer can be analyzed.

It is particularly advantageous to obtain information concerning the states of the registers or ports arranged in the computer. By integrating the analysis program into the normal operating system, it can be assured that important functions can still be monitored by the computer. Thus it is assured that even when applications are running, no disruptions of the essential open-loop or closed-loop control functions of the computer occur as a result of the analysis.

DETAILED DESCRIPTION

Figure 1:
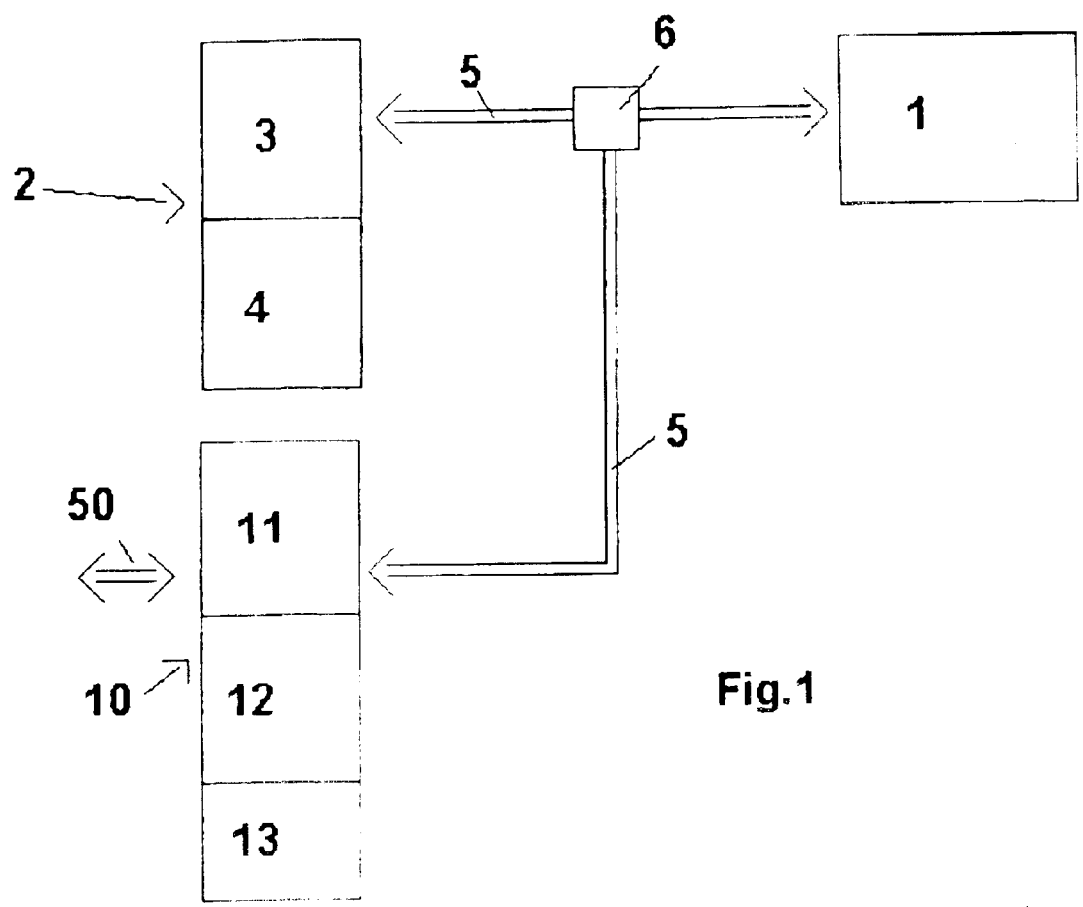
FIG. 1 shows a schematic view of a computer, a working memory, and an alternate memory.

In FIG. 1, a computer (microcontroller) 1 is depicted during the checking of its functioning. Microcomputer 1, in a normal operating state, is connected to a working memory 2 via bus lines 5. Bus lines 5 are designed both for the exchange of addresses as well as for the exchange of data (address and data bus). Working memory 2 has a program area 3 and a data area 4. During normal operation, computer 1 processes a program that is contained in the program memory area 3 and for this purpose uses the data that is stored in data area 4. For the purpose of checking the functioning of computer 1, provision is made for a changeover switch 6. By activating changeover switch 6, computer 1 is connected via bus lines 5 to alternate memory 10 and no longer to working memory 2. Alternate memory 10 has an alternate program area 11, an alternate data area 12, and an auxiliary program area 13. As indicated by bus lines 50 arranged in FIG. 1 to the left of alternate memory 10, alternate memory 10 not only has the capacity to exchange information with computer 1, but it also can be written into or read out from, from the outside.

Alternatively, it is also possible that changeover switch 6 only changes one part of working memory over to an alternate memory. For example, it would be possible only to change program area 3 over to alternate program area 11, while data area 4 would be used by computer 1 as before.

Alternate memory 10 has the property that it can be written into and the memory content can be read out from the outside. This makes it possible to check the mode of functioning of computer 1 and the functioning of selected program parts or data areas. For this purpose, in alternate memory 10, for example in alternate program area 11 or in alternate data area 12, information is written-in that differs from the information in program area 3 and in data area 4, respectively. Computer 1, for example, can be an open-loop control for an internal combustion engine. For these open-loop control tasks, certain closed-loop control programs are stored in the program area, and in data area 4 performance data is stored that is specific to the engine in question and that is used by the closed-loop control programs. In order to improve the open-loop control of the engine for test purposes, altered closed-loop control programs and altered performance data are written into alternate memory 10, and the check test is thus carried out as to whether the altered closed-loop control or open-loop control programs and the altered performance data bring about an improved functioning of computer 1 or of the functions under the open-loop control of computer 1. In this context, it is of particular interest for the checking of new closed-loop or open-loop control programs to investigate the mode of operation or functioning of computer 1 in certain extreme operating states. For this purpose, it must be possible to check the internal operating states of computer 1. Checking of this type is not necessary in the normal operation of computer 1. Therefore, for alternate memory 10 provision is made for an auxiliary program area 13, in which appropriate auxiliary programs are stored which make possible a checking of this type of the functioning and mode of operation of computer 1.

Figure 2:
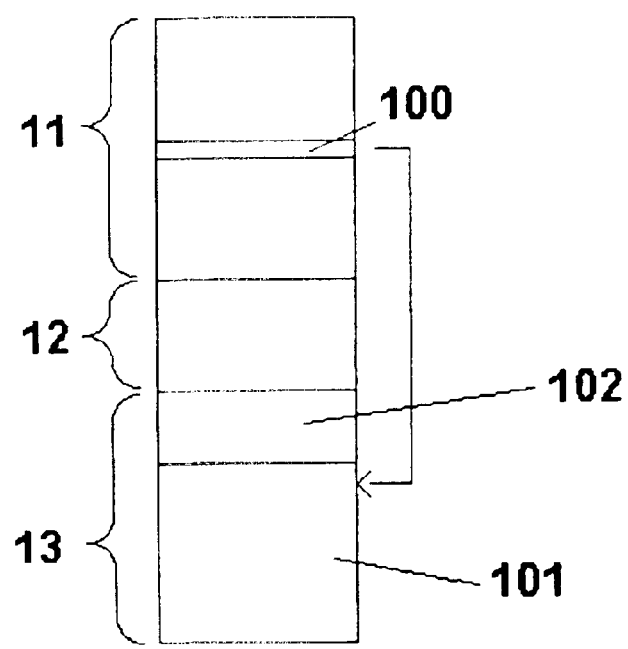
FIG. 2 shows a more detailed view of the alternate memory.

The mode of functioning of this auxiliary program is further explained on the basis of FIG. 2. In FIG. 2, once again alternate memory 10 having alternate program area 11, alternate data area 12, and auxiliary program area 13 is depicted in detail. Alternate memory 10 is configured, for example, as a so-called dual port RAM, in which, in addition to computer 1, access may be had to alternate memory 10 from the outside. Auxiliary program 13 contains various areas having various functions. Program area 101 is an analysis program, which is executed by computer 1 and which functions to analyze the operating states of computer 1. Furthermore, provision is made for an auxiliary program memory area 102, which functions to store data for the analysis program.

Analysis program 101 (i.e., the program that is stored in area 101) is designed to analyze internal states of computer 1. For this purpose, analysis program 101, for example, has the capacity to cause computer 1 to read out the state of individual internal registers, ports, or other memory areas that cannot be read out directly from the outside. This takes place by analysis program 101 causing computer 1 to give the data stored in a certain register to the data bus and to indicate on the address bus an address that is found in auxiliary program memory area 102. In this way, the state of the register in question is written into auxiliary program memory area 102. The state of this register arranged in computer 1 can then be analyzed by reading out from the outside the appropriate memory locations in auxiliary program memory area 102. Furthermore, auxiliary program memory area 102 can also be used to communicate to the analysis program which registers, ports, and the like of computer 1 are to be analyzed. For this purpose, instructions are to be written in from outside into a preselected area of auxiliary program memory area 102, which cause analysis program 101 to investigate the corresponding areas of computer 1.

For activating auxiliary program 13, provision is to be made for the possibility that computer 1 leaves normal program 11 and is prompted to process auxiliary program 13. For example, this can occur by making provision in alternate program area 11 for an operating system that from time to time checks to determine whether there is a request from the outside to process auxiliary program 13. A request of this type could, for example, be written into auxiliary program memory area 102. In this case, the operating system contains a query loop, which checks to determine whether there is a corresponding instruction at the corresponding location of auxiliary program memory area 102. If a corresponding instruction exists, analysis program 101 is then activated.

A further possibility is depicted in FIG. 2, in which a jump instruction 100 to analysis program 101 is provided from outside at a predetermined memory location 100 in the normal program flow provided for in alternate program area 11. This jump instruction, if necessary, is written in from outside into alternate memory 10. In addition to an unconditional jump instruction, for example, interrupt instructions or the like are also conceivable. By writing a jump instruction of this type into memory location 100, whenever the program located at the corresponding location in alternate program area 11 is called up, analysis program 101 is processed instead of this program.

If the checking of computer 1 takes place during the ongoing operation of computer 1, then care should be taken that at least the most important control functions executed by computer 1 are not disturbed as a result of the checking of the functioning of computer 1. However, this is usually not a problem in modern computers, since, in addition to the actual control functions, they monitor another series of subsidiary functions, which can also be omitted from time to time without resulting in a substantial impairment of the system to be controlled. If computer 1, for example, is provided for controlling the engine functioning of a gasoline engine, then, for example, the processing of program parts concerned with the injection of fuel and with ignition should not be disturbed. These functions are processed by computer 1 with precedence over all other functions. Additionally, however, provision is made for further programs, for example, programs that collects various data on the operating states of the engine and transmit them for checking functions. In this context, it is assured by an operating system that the essential control functions are constantly monitored, whereas the less important control or analysis functions of the engine are only monitored when no important control functions are taking place. Analysis program 101 should only be activated if no important control functions have to be processed by computer 1. As already indicated, this can be done by including a jump instruction 100 in a less important program part. Normally, the various functions that the programs monitor are realized by various program modules, and it is assured by an operating system (however it is executed), that the modules that are relevant for important control functions are also more often called up, i.e., are processed by the computer. The jump instruction should be written into a less important module in order, during ongoing operation of the computer, to be able still to monitor the important control functions.

A further possibility is generated by the fact that the operating system in alternate program area 11 regularly queries as to whether the activation of analysis program 101 is desired by a user and only permits this to happen if no important control functions have to be monitored by computer 1. This manner of proceeding also makes it possible to investigate the operating state of computer 1 during the ongoing control function. Thus, under real operating conditions using the real hardware of computer 1, statements can be generated concerning the operating states of computer 1, the execution of a particular program inside computer 1, or concerning the relationship of the internal states of the processor and the closed-loop and open-loop control functions carried out by the computer.

Figure 3:
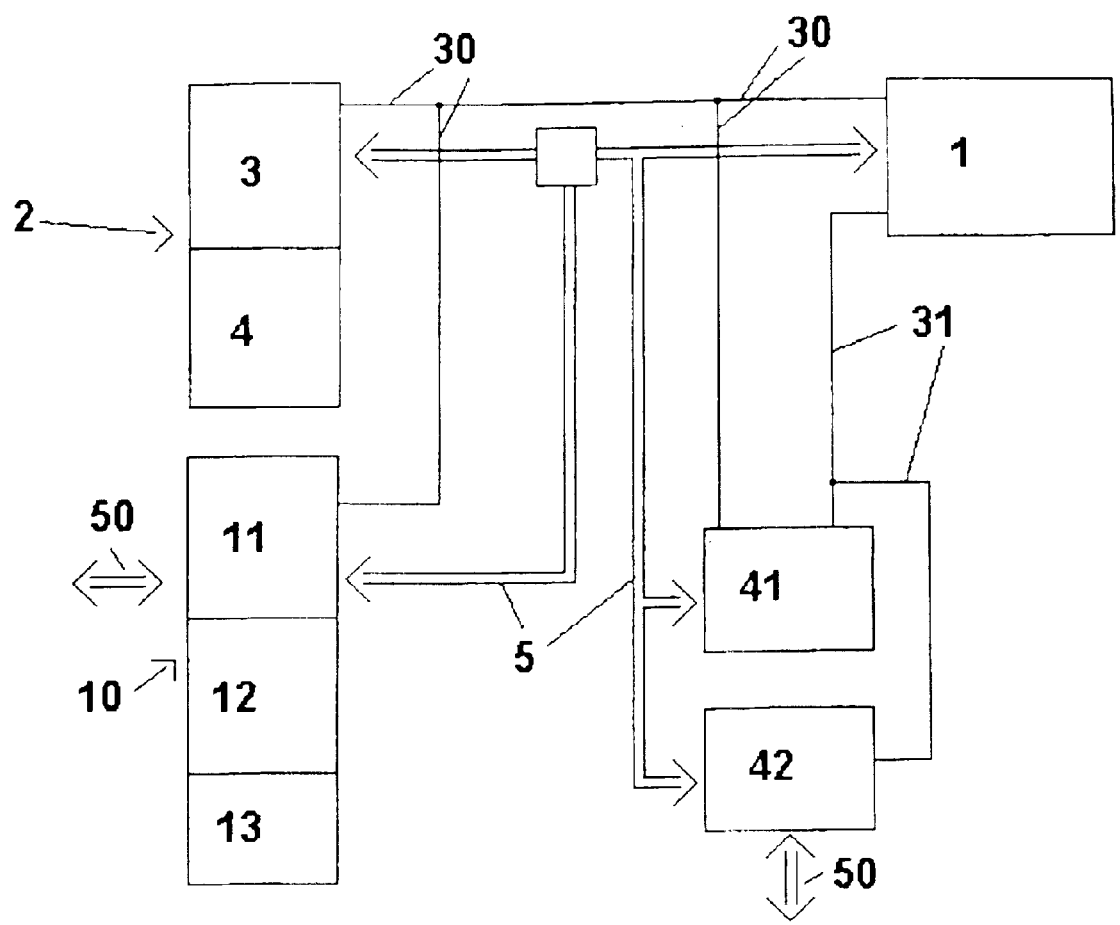
FIG. 3 elaborates on a further exemplary embodiment of the present invention based on the assumption that the computer has read-only access to the working memory.

There are computers 1 which allow access to their working memory 2 that is only readout but not write-in. A computer of this type and the means necessary for checking a computer of this type are depicted in FIG. 3. Reference numerals 1 through 6 and 10 through 13 again designate the same objects as were described in FIG. 1.

In contrast to FIG. 1, however, in FIG. 3, read line 30 and write line 31 of computer 1 are depicted. Using a signal on read line 30, computer 1 signals to the memory chips that a reading access is now operative. This takes place such that the memory units, in response to the signal on line 30, give to the data bus the memory content of the memory location that is indicated on the address bus. Using a signal on write line 31, the memory chips are signaled that there is now a writing access, i.e., the memory chips write the data that are located on the data bus into the memory chips having the address that is on the address bus.

As can be seen in FIG. 3, working memory 2 and alternate memory 10 are only connected to computer 1 by a read line 30, i.e., the programs or data can only be readout from these memory units. Furthermore, there is one additional memory chip 41, which is connected to computer 1 both by read line 30 as well as by write line 31. The computer 1 can therefore both write as well as read out data in memory 41. Memory chip 41, of course, is also connected to computer 1 by bus lines 5.

Computer 1, working memory 2, and memory 41 constitute a control device, as can be used, for example, for the control of gasoline engines. Memory 41, to which computer 1 has both writing as well as reading access, makes it possible for computer 1 to temporarily store data. For checking the functioning of computer 1, provision is made for a further memory 42, which is connected to computer 1 by data lines 5 and write line 31. However, from outside, access can be had to memory 42 that is both writing as well as reading. This is indicated by bus lines 50 below memory chip 42 in FIG. 3.

Memory chip 42 is now arranged by its address area so that its addressable area completely overlaps with the addressable area of memory 41. However, provision can additionally be made that memory chip 42 is larger than memory 41 and therefore has an additional addressable area. By reading out data in memory 42, information concerning the memory content of memory 41 and additional information can also be read out. Since in every write instruction, as a result of the overlapping address areas, all the data that is written into memory 41 by computer 1 is also simultaneously written into memory 42, by reading out the memory content of memory 42, it can therefore be determined how the memory content of memory 41 looks.

Furthermore, memory 42 can be used to transport results of analysis program 101 to the outside. For this purpose, the analysis program provides that the content of certain internal registers, ports, etc. of computer 1 is given to the data bus, a write instruction simultaneously being generated and an address being given to the address bus, the address being located in the addressable area of memory 42. To the extent that no other programs can have access to the corresponding memory locations, this data is also located in an address area in which memory 41 is addressable. However, if writing this data in memory 41 is to be avoided, for example because memory 41 is entirely needed for the normal operation of computer 1, then the data can be stored in additional address areas of memory 42, in which memory 41 is not addressable.

The reason for the somewhat complicated design in FIG. 3 is due to the fact that the checking of the functioning of computer 1 requires an intervention in the hardware of a corresponding control unit. It is therefore often not possible, as needed, to contact the write or read line present in principle in the computer. Rather, one is usually required to use the lines that are provided as a matter of course for the special hardware design. Since for the normal operation of a control unit having a computer 1 it is sufficient if only a reading access is possible to working memory 2 and provision is only made for a small memory 41 relative to memory 2, access to memory 41 being possible in both reading and writing modes, a corresponding device for checking the functioning of a computer 1 in a control device of this type must be adapted to the hardware accordingly.

What is claimed is:

1. A method for checking a functioning of a computer, the computer, in a normal operating state, accessing a working memory using bus lines, a content of the working memory being able to be influenced by a user, the method comprising the steps of:

diverting an access of the computer, by a switchover device, such that the access is directed to an alternate memory rather than to the working memory; and executing an auxiliary program in the alternate memory when activated by the computer, the auxiliary program making available information concerning internal operating states of the computer;

wherein the auxiliary program contains program steps that cause the computer to give a content of internal registers and ports to a bus using a write instruction for a certain address.

2. The method according to claim 1, further comprising the step of posing instructions in the auxiliary program as to which information regarding the computer should be investigated.

3. The method according to claim 1, further comprising the step of reading out, by the user, a memory in an address area.

4. The method according to claim 1, further comprising the step of executing an instruction in an alternate program area for causing the computer to begin processing an analysis program and for activating the auxiliary program.

5. A method for checking a functioning of a computer, the computer, in a normal operating state, accessing a working memory using bus lines, a content of the working memory being able to be influenced by a user, the method comprising the steps of:

diverting an access of the computer, by a switchover device, such that the access is directed to an alternate memory rather than to the working memory;

executing an auxiliary program in the alternate memory when activated by the computer, the auxiliary program making available information concerning internal operating states of the computer; and executing an instruction in an alternate program area for causing the computer to begin processing an analysis program and for activating the auxiliary program;

wherein the alternate program area contains a first program module and a second program module of greater importance than the first program module, and further comprising the step of writing the instruction into the first program module.

6. A method for checking a functioning of a computer, the computer, in a normal operating state, accessing a working memory using bus lines, a content of the working memory being able to be influenced by a user, the method comprising the steps of:

diverting an access of the computer, by a switchover device, such that the access is directed to an alternate memory rather than to the working memory; and executing an auxiliary program in the alternate memory when activated by the computer, the auxiliary program making available information concerning internal operating states of the computer;

using an operating system, generating a query as to whether an analysis of the computer should be undertaken; and using the operating system, activating an analysis program if the query is answered affirmatively.

7. A method for checking a functioning of a computer, the computer, in a normal operating state, accessing a working memory using bus lines, a content of the working memory being able to be influenced by a user, the method comprising the steps of:

diverting an access of the computer, by a switchover device, such that the access is directed to an alternate memory rather than to the working memory;

executing an auxiliary program in the alternate memory when activated by the computer, the auxiliary program making available information concerning internal operating states of the computer; and performing a check periodically to determine whether there is a request from an outside source to process the auxiliary program.

8. The method according to claim 7, further comprising the step of executing an analysis program in response to determining that the request has been provided.

9. The method according to claim 7, wherein one of a jump instruction and an interrupt instruction is provided at a predetermined memory location to start processing an analysis program.

* * * * *